2,886,600
PROCESS FOR PRODUCING ISOBUTYL ETHERS

Lee H. Horsley and Peter S. Petrie, Midland, Mich., assignors to The Dow Chemical Company, Midland, Mich., a corporation of Delaware No Drawing. Application March 29, 1957
Serial No. 649,295

19 Claims. (Cl. 260—613)

This invention relates to processes for making isobutyl ethers of hydroxy compounds. It particularly relates to, though it is not restricted to, the production of isobutyl ethers of glycol and polyglycol monoethers.

According to the invention, a compound containing one alcoholic or phenolic hydroxyl group is reacted with one mole of isobutylene oxide thus forming a 2-methyl-2-hydroxy-propyl ether of the hydroxy compound which is then dehydrated to form the corresponding methallyl ether which in turn is hydrogenated to form the desired isobutyl ether. These reactions may be graphically represented as follows:

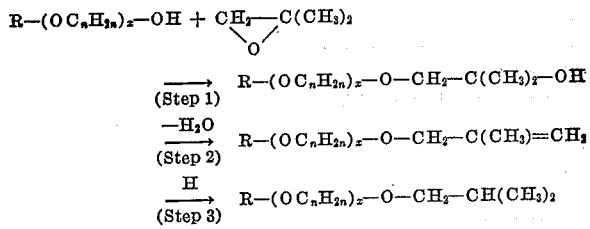

wherein R is a primary or secondary alkyl, aryl or alkaryl radical containing up to 22 carbon atoms, $n$ is an integer from 2 to 4 and $x$ is an integer from 0 to 50.

In Step 1, the oxyalkylation reaction, the conventional alkaline catalysts and reaction conditions are used. Acid catalysts cause the formation of the isomeric 1,1-dimethyl-2-hydroxyethyl ether which is difficult to dehydrate, and also catalyze the isomerization of isobutylene oxide to isobutyraldehyde. We prefer to use a strong alkali catalyst, such as the alkali metals, their oxides, hydroxides and alcoholates. Reaction temperatures are usually in the range 60–150° C. and pressures are in the range 0–100 p.s.i.g. Since isobutylene oxide reacts only very slowly or not at all with the product of Step 1, an excess of the oxide may be used in Step 1 without appreciable further reaction after one mole has reacted.

The hydroxy compound used in Step 1 of the process may be any compound having the formula shown. Examples of suitable compounds include all those in which R is a primary or secondary alkyl group containing up to 22 carbon atoms, such as butyl, hexyl, decyl, dodecyl, tridecyl, hexadecyl, octadecyl, eicosyl, docosyl, isobutyl, sec.-butyl and capryl, or an aryl or alkaryl group containing up to 22 carbon atoms, such as phenyl, cresyl, xylyl, naphthyl, butylphenyl, octylphenyl, dodecylphenyl, tridecylphenyl, phenylphenyl, cyclohexylphenyl, dibutylphenyl, dioctylphenyl, and the like. The polyoxyalkylene chain, $(OC_nH_{2n})_x$, if present, may be derived from ethylene, 1,2-propylene or 1,2- or 2,3-butylene oxide or mixtures thereof and may contain any number of oxyalkylene units up to about 50.

The dehydration reaction of Step 2 is preferably a thermal cracking process in which either the ether-alcohol formed in Step 1 or an ester thereof, preferably the acetate, is pyrolyzed with or without a catalyst. The reaction may be broadly represented by the equation $$R-(OC_nH_{2n})_x-O-CH_2-C(CH_3)_2-O-$$
$$[COCH_2]_y-H \rightarrow R-(OC_nH_{2n})_x-O-CH_2-$$
$$C(CH_3)=CH_2+HO-(COCH_2)_y-H$$

wherein R, $n$ and $x$ are as before and $y$ is 0 or 1.

In the preferred process, the ether-alcohol formed in Step 1 is acetylated, preferably by reaction with acetic anhydride, and the acetate is then pyrolyzed. The by-product acetic acid can be recovered and recycled in the process.

The pyrolysis of the ether-alcohol or its ester may be conducted in either liquid or vapor phase and in the presence or absence of catalysts. It is obviously not practical to pyrolyze in the vapor phase those compounds having very high boiling points, such as polyglycol derivatives of high molecular weight. Such materials, however, are easily pyrolyzed in the liquid phase.

The pyrolysis of the ether-alcohols themselves is catalyzed by the usual dehydration catalysts, such as silica, alumina, activated carbon, ceramic chips, broken glass and the like, activated carbon being the preferred catalyst. In the pyrolysis of the ether-esters, catalysts exert only minor influence. However, it is advantageous to use a solid catalyst such as charcoal, Berl saddles and the like, since they have some catalytic effect and also serve as heat transfer and equalization media.

Pyrolysis temperatures may be varied widely, depending on the particular compound being pyrolyzed, the contact time, the catalyst, if any, and whether the reaction is vapor or liquid phase. In the preferred process of catalytic vapor phase pyrolysis, temperatures in the range 250–450° C., and preferably about 300–400° are generally used. Contact times are usually about 5–60 seconds. In liquid phase pyrolysis, somewhat lower temperatures, about 100–300° C., are generally used, together with longer contact times. The latter may vary from a few minutes to several hours, a preferred range being about 0.2 to 2 hours.

It is sometimes advantageous to conduct the pyrolysis step under reduced pressure. In vapor phase pyrolysis this aids in the vaporization of materials of low volatility while in liquid phase pyrolysis it aids in the removal of volatile products of the pyrolysis.

Step 3, the hydrogenation of the olefinic compound produced in the pyrolysis step, is carried out with the usual catalysts and conditions for the hydrogenation of olefinic materials. Suitable catalysts include platinum, palladium, nickel, and the like, the temperatures and pressures being those generally used with these catalysts. Thus, platinum is effective at room temperature and atmospheric pressure; palladium at 50–100° and 15–100 p.s.i.g. and nickel at 100–200° and 100–1000 p.s.i.g.

The practice of the invention is illustrated by the following examples.

STEP 1.—OXYALKYLATION

The hydroxy compound to be oxyalkylated was placed in a suitable reactor having means for heating and agitating the contents. The alkali catalyst, usually potassium hydroxide, was dissolved in the hydroxy compound, air in the reactor was replaced with nitrogen, the temperature was adjusted to the desired point and isobutylene oxide was gradually added. When the reaction was substantially complete, as indicated by the pressure, the product was neutralized with carbon dioxide or acetic acid, stripped of unreacted isobutylene oxide and, where possible, purified by distillation. The extent of reaction of the hydroxy compound could be determined readily by the standard OH determination by reaction with phthalic anhydride in pyridine, since the tert.-OH groups formed from the isobutylene oxide are unreactive in this procedure. The results of several such reactions are summarized in Table I.

Some of the oxybutylated products listed in Table I were acetylated by being heated for 2–6 hours at 100–150° C. with a molar excess of acetic anhydride. If possible, the acetates were then purified by distillation.

Table II shows some of the properties of the distilled products of Table I and the corresponding acetates.

B. Liquid phase cleavage

The liquid was heated in a flask at or below atmospheric pressure and products were analyzed by distillation in so far as possible. Results of some typical experiments are summarized in Table IV.

The products were purified by distillation if possible. The polyglycol ethers, being substantially non-volatile, were purified by vacuum stripping to remove volatile materials, caustic saponification to cleave esters and

TABLE I.—REACTION OF ISOBUTYLENE OXIDE WITH HYDROXY COMPOUNDS

| Example No. | Hydroxy Compound | Mole Ratio, Oxide/ Hydroxy Cpd. | Time, Hrs. | Temp., °C. | Pressure, p.s.i.g. | Conversion, Hydroxy Cpd., Percent | Yield,[a] Percent |
|---|---|---|---|---|---|---|---|
| 1 | Methanol | 1.07 | 30 | 60–95 | 0 | 95 | 87 |
| 2 | Isopropanol | 1.10 | 70 | 65–88 | 0 | 58 | 62 |
| 3 | x-Octyl alcohol [b] | 1.10 | 7 | 90–115 | 0 | 70 | 79 |
| 4 | Phenol | 1.10 | 8 | 75–125 | 0 | 100 | 84 |
| 5 | Di-sec.-Butylphenol | 1.10 | 12 | 95–125 | 0 | 100 | 51 |
| 6 | 1-Methoxy-2-Propanol | 1.20 | 30 | 90–125 | 0 | 65 | 89 |
| 7 | 1-Phenoxy-2-Propanol | 1.20 | 18 | 90–125 | 0 | 76 | 80 |
| 8 | E-600 Methyl Ether [c] | 1.25 | 1.5 | 80–100 | 0 | 90 | |
| 9 | P-600 Methyl Ether [c] | 2.2 | 18 | 75–125 | 0 | 88 | |
| 10 | P-600 Methyl Ether | 1.3 | 3 | 140–150 | 10–50 | 67 | |
| 11 | P-400 Butyl Ether | 3.0 | 58 | 90–150 | 0 | 95 | |
| 12 | P-600 x-Octyl [b] Ether | 2.2 | 31 | 100–150 | 0 | 85 | |
| 13 | P-350 Phenyl Ether | 3.0 | 34 | 90–150 | 0 | 99 | |
| 14 | P-500 x-Tridecyl [b] Ether | 2.5 | 40 | 90–150 | 0 | 84 | |
| 15 | P-500 2-Ethylhexyl Ether | 3.0 | 72 | 90–150 | 0 | 90 | |
| 16 | P-500 1,3-Dimethoxy-2-Propyl Ether | 2.5 | 42 | 90–150 | 0 | 93 | |

[a] Yield of distilled mono-oxybutylated product based on hydroxy compound consumed.
[b] Oxo process alcohol.
[c] E=polyoxyethylene glycol; P=polyoxypropylene glycol. Suffix numbers are average molecular weights.

TABLE II.—PHYSICAL PROPERTIES

| Compound No.[a] | Compound | Boiling Point, °C./mm. | $N_D^{25}$ | $d_{25}^{25}$ |
|---|---|---|---|---|
| 1 | 1-Methoxy-2-Methyl-2-Propanol | 115–116/760 | 1.4024 | 0.8895 |
| 2 | 1-Isopropoxy-2-Methyl-2-Propanol | 133/760 | 1.4029 | 0.8512 |
| 3 | 1-Octyloxy-2-Methyl-2-Propanol | 118–124/20 | 1.4300 | 0.8597 |
| 4 | 1-Phenoxy-2-Methyl-2-Propanol | 120–126/20 | 1.5112 | 1.0284 |
| 5 | 1-(Di-sec.-Butylphenoxy)-2-Methyl-2-Propanol | 165–168/10 | 1.4948 | 0.9408 |
| 6 | 1-(1-Methoxyisopropoxy)-2-Methyl-2-Propanol | 178–187/760 | 1.4172 | 0.9265 |
| 7 | 1-(1-Phenoxyisopropoxy)-2-Methyl-2-Propanol | 158–165/20 | 1.4919 | 1.0174 |
| 1a | Acetate of No. 1 | 140–143/760 | 1.4030 | 0.9461 |
| 2a | Acetate of No. 2 | 160–164/760 | 1.4033 | 0.9043 |
| 3a | Acetate of No. 3 | 135–138/20 | 1.4259 | 0.8925 |
| 4a | Acetate of No. 4 | 136–139/20 | 1.4900 | 1.0423 |
| 5a | Acetate of No. 5 | 175–178/10 | 1.4846 | 0.9584 |
| 6a | Acetate of No. 6 | 96–101/20 | 1.4150 | 0.9600 |
| 7a | Acetate of No. 7 | 173–177/20 | 1.4812 | 1.0337 |

[a] Compounds listed are products from the corresponding examples of Table I.

STEP 2.—DEHYDRATION

A. By vapor phase pyrolysis

The apparatus consisted of a 1" x 24" stainless steel tube, electrically heated, the first 6" of which was packed with Berl saddles and used as a preheater and 18" of which were packed with the catalyst and constituted the reaction chamber. In operation, the tube was heated to the desired temperature and the compound to be pyrolyzed was then pumped slowly into the preheater where it was vaporized. After passing through the reaction chamber the products passed into a condenser from which the condensate was collected and analyzed. Results of some typical experiments are shown in Table III.

water-washing to remove glycols, salts and any other water soluble impurity. Yields were based on analyses for olefinic unsaturation in the products.

STEP 3.—HYDROGENATION

Palladium was used as the catalyst, the temperature was 70° C. and the pressure was 40 p.s.i.g. In each case, all the unsaturated ether reacted and yields were high, although in a few experiments small amounts of polymeric by-products were obtained.

Where possible, the products were purified by distillation; otherwise they were stripped of volatile matter and filtered.

Results of some typical experiments are shown in Table V.

TABLE III.—VAPOR PHASE PYROLYSIS

| Compound No.[a] | Catalyst | Contact Time, Sec. | Temp., °C. | Products Isolated, Mole Percent | | | |
|---|---|---|---|---|---|---|---|
| | | | | Orig. Cpd. | Isobutylene | Isobutyraldehyde | Methallyl Ether |
| 1 | Alumina | 6 | 400 | | 55 | 2 | 5 |
| 1 | ....do | 25 | 300 | | 9 | 18 | 16 |
| 1 | ....do [b] | 25 | 300 | | 8 | 30 | 23 |
| 1 [c] | Charcoal | 17 | 400 | | 2 | 19 | 46 |
| 1 | ....do | 20 | 425 | | 5 | 13 | 16 |
| 1 | ....do | 20 | 500 | | 14 | 28 | 10 |
| 1 | ....do | 25 | 400 | | 2 | 26 | 66 |
| 1a | ....do | 34 | 300 | | 0 | 3 | 65 |
| 1a | ....do | 30 | 300 | 75 | 0 | 1 | 16 |
| 1a | Berl Saddles | 30 | 400 | 6 | 0 | 4 | 81 |
| 1a | ....do | 38 | 280 | | d 22 | 23 | 23 |
| 2 | Alumina | 25 | 400 | | d 8 | 9 | 69 |
| 2a | Berl Saddles | 37 | 400 | | 3 | 18 | 32 |
| 3 | ....do | 37 | 400 | 55 | | | 77 |
| 3a | ....do | 45 | 400 | | | | 55 |
| 5a | ....do | 35 | 400 | | 9 | 17 | 56 |
| 6a | ....do | 42 | 400 | | 3 | 12 | 68 |
| 7a | ....do | | | | | | |

[a] The compounds used were those having these numbers in Table II.
[b] Old catalyst previously used in the process.
[c] A molar equivalent of acetic acid was mixed with the compound.
[d] Contained large amounts of propylene.

TABLE IV.—LIQUID PHASE PYROLYSIS

| Compound No.[a] | Catalyst, g./mole | | Time, hr. | Temp., °C. | Press., mm. | Products Isolated, Mole Percent | | |
|---|---|---|---|---|---|---|---|---|
| | | | | | | Original Compound | Isobutyraldehyde | Methallyl Ether |
| 1 | tol. sulf.[c] | 8 | 5 | 110 | 760 | | 72 | 13 |
| 1 [b] | H₂SO₄ | 0.4 | 2 | 100 | 760 | | 77 | 11 |
| 1 | Iodine | 2.5 | 3 | 110 | 760 | | 61 | 11 |
| 1a | Dowex-50 [c] | 4.0 | 1.5 | 125 | 760 | | 13 | 72 |
| 2a | ....do | 8.0 | 0.7 | 110–175 | 760 | | 29 | 38 |
| 3a | ....do | 8.0 | 3 | 100–135 | 30 | 57 | | 26 |
| 4a | ....do | 6.7 | 5 | 130 | 30 | 52 | | 27 |
| 6a | ....do | 3.3 | 3 | 100 | 60 | | 6 | 26 |
| 7a | ....do | 10.0 | 1 | 150 | 20 | | | 75 |
| 8 | None | | 2 | 250–325 | 20 | 83 | 4 | 2 |
| 8 | H₃PO₄ | 3 | 1 | 250–300 | 20 | | 43 | 29 |
| 8a | None | | 0.7 | 250–310 | 20 | 14 | | 48 |
| 8a | Tonsil [d] | 14 | 0.5 | 160–220 | 20 | 17 | | 14 |
| 9 | H₂SO₄ | 163 | 1.0 | 20 | 760 | | | 22 |
| 9a | None | | 1.5 | 250 | 20 | 27 | | 50 |
| 9a | ....do | | 3.0 | 250 | 20 | 19 | | 60 |
| 9a | ....do | | 5.5 | 250 | 20 | 16 | | 69 |

[a] Numbers are the same as in Tables I and II.
[b] One molar equivalent of acetic acid was mixed with the compound before pyrolysis.
[c] A sulfonic acid ion-exchange resin sold by the Dow Chemical Company.
[d] An activated earth.

TABLE V.—HYDROGENATION OF METHALLYL ETHERS

| Methallyl Ether | Moles | Cat., g. | Time, Hr. | Yield, Percent of Theory |
|---|---|---|---|---|
| Methyl [a] | 0.25 | 1.0 | 2 | 89 |
| Phenyl | 0.10 | 1.0 | 1 | 81 |
| Di-sec.-Butylphenyl | 0.10 | 0.5 | 1.5 | 77 |
| P-600 Methyl Ether [b] | 0.22 | 2.0 | 4 | 92 |

[a] Toluene was used as a solvent.
[b] Methyl methallyl diether of polyoxypropylene glycol of molecular weight 600.

The products produced by the process of the invention have a wide range of physical and chemical properties and uses, depending on their structure. Some physical properties of some of them are shown in Table VI.

TABLE VI.—PHYSICAL PROPERTIES

| Ether | B. P., °C./mm. | $d_{25}^{25}$ | $N_D^{25}$ |
|---|---|---|---|
| Methyl Methallyl | 67–70/760 | | 1.3938 |
| Isopropyl Methallyl | 100–105/760 | | 1.3990 |
| Isooctyl Methallyl | 100–105/20 | 0.8118 | 1.4320 |
| Di-sec.-Butylphenyl Methallyl | 145–155/10 | 0.9192 | 1.5045 |
| 1-Methoxy-2-propyl Methallyl | 153–160/760 | 0.8660 | 1.4160 |
| 1-Phenoxy-2-propyl Methallyl | 135–145/20 | 0.9816 | 1.4990 |
| Methyl Isobutyl | 57–60/760 | 0.7320 | 1.3668 |
| Di-sec.-Butylphenyl Isobutyl | 143–152/760 | 0.8960 | 1.4953 |
| 1-Phenoxy-2-propyl Isobutyl | 135–145/20 | 0.9450 | 1.4821 |

Both the methallyl and the isobutyl ethers of the polyoxyalkylene glycol ethers were thick, non-volatile oils. The latter were excellent lubricants and hydraulic fluids having exceptional stability to heat and oxidation.

We claim:

1. A process for producing an isobutyl ether comprising (1) reacting isobutylene oxide with a hydroxy compound having the formula

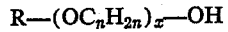

$$R—(OC_nH_{2n})_x—OH$$

wherein R is a hydrocarbon radical selected from the group consisting of primary and secondary alkyl, aryl and alkaryl radicals containing up to 22 carbon atoms, $n$ is an integer from 2 to 4 and $x$ is an integer from 2 to 50, thus to form the 2-methyl-2-hydroxypropyl ether of the hydroxy compound; (2) dehydrating the said 2-methyl-2-hydroxypropyl ether, thus to form the corresponding methallyl ether; and (3) hydrogenating the said methallyl ether, thus to form the desired isobutyl ether.

2. A process as defined in claim 1 wherein $x$ is about 5 to 20.

3. A process for producing an isobutyl ether comprising catalytically hydrogenating a methallyl ether having the formula

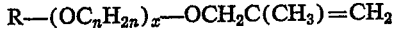

$$R—(OC_nH_{2n})_x—OCH_2C(CH_3)=CH_2$$

wherein R, $n$ and $x$ are as defined in claim 1, whereby the methallyl ether is converted to the corresponding isobutyl ether.

4. A process as defined in claim 1 wherein R is an alkyl radical.

5. A process as defined in claim 1 wherein $n$ is 2.

6. A process as defined in claim 4 wherein R is a methyl radical.

7. A process as defined in claim 1 wherein $n$ is 3.

8. A process as defined in claim 4 wherein R is an isopropyl radical.

9. A process as defined in claim 1 wherein $n$ is 4.

10. A process as defined in claim 4 wherein R is an octyl radical.

11. A process as defined in claim 1 wherein R is an aryl radical.

12. A process as defined in claim 11 wherein R is a phenyl radical.

13. A process as defined in claim 1 wherein R is an alkaryl radical.

14. A process as defined in claim 13 wherein R is a di-sec.-butylphenyl radical.

15. A process for producing a methallyl ether having the formula $$R-(OC_nH_{2n})_x-O-CH_2-C(CH_3)=CH_2$$

wherein R, $n$ and $x$ are as defined in claim 1, comprising heating a compound having the formula $$R-(OC_nH_{2n})_x-O-CH_2-C(CH_3)_2-O(COCH_2)_y-H$$

wherein R, $n$ and $x$ are as before and $y$ is an integer from 0 to 1, at a temperature above that at which it is stable but below that at which the methallyl ether is unstable.

16. A process as defined in claim 15 wherein $y$ is 0.

17. A process as defined in claim 15 wherein $y$ is 1.

18. A process as defined in claim 15 wherein the material being heated is in the vapor phase.

19. A process as defined in claim 15 wherein the material being heated is in the liquid phase.

References Cited in the file of this patent
UNITED STATES PATENTS

| | | |
|---|---|---|
| 2,122,812 | Groll et al. | July 5, 1938 |
| 2,327,053 | Marple et al. | Aug. 17, 1943 |
| 2,671,112 | Inhoffen et al. | Mar. 2, 1954 |

FOREIGN PATENTS

| | | |
|---|---|---|
| 525,843 | Canada | June 5, 1956 |